United States Patent [19]
Clayton

[11] 3,754,560
[45] Aug. 28, 1973

[54] METHOD AND APPARATUS FOR MEASURING AND CONTROLLING THE VOLUME OF LIQUID IN A VESSEL

[75] Inventor: Hadwen A. Clayton, Bartlesville, Okla.

[73] Assignee: Phillips Petroleum Company, Bartlesville, Okla.

[22] Filed: Oct. 18, 1971

[21] Appl. No.: 189,990

[52] U.S. Cl. .................................. 137/2, 137/392
[51] Int. Cl. ...................... F16k 31/02, G05d 9/12
[58] Field of Search ................. 137/2, 41, 42, 44, 137/386, 391, 392, 412, 423; 73/290, 290 B; 114/125

[56] References Cited
UNITED STATES PATENTS 2,575,616  11/1951  DeGiers et al. .................. 137/423
2,843,144  7/1958   Robinson et al. ................. 137/412 X
2,952,774  9/1960   Howard ............................ 73/290 R
3,570,629  3/1971   Dahm et al. ...................... 137/44

Primary Examiner—Martin P. Schwadron
Assistant Examiner—David R. Matthews
Attorney—Young and Quigg

[57] ABSTRACT

A method and apparatus of a movable vessel discharging fluid for measuring the liquid level in the vessel at spaced locations, delivering a signal in response to the measurements and representative of the volume of liquid in the vessel and maintaining the volume of liquid in the vessel in response to the signal.

12 Claims, 4 Drawing Figures

PATENTED AUG 28 1973　　　　　　　　　　　　　3,754,560
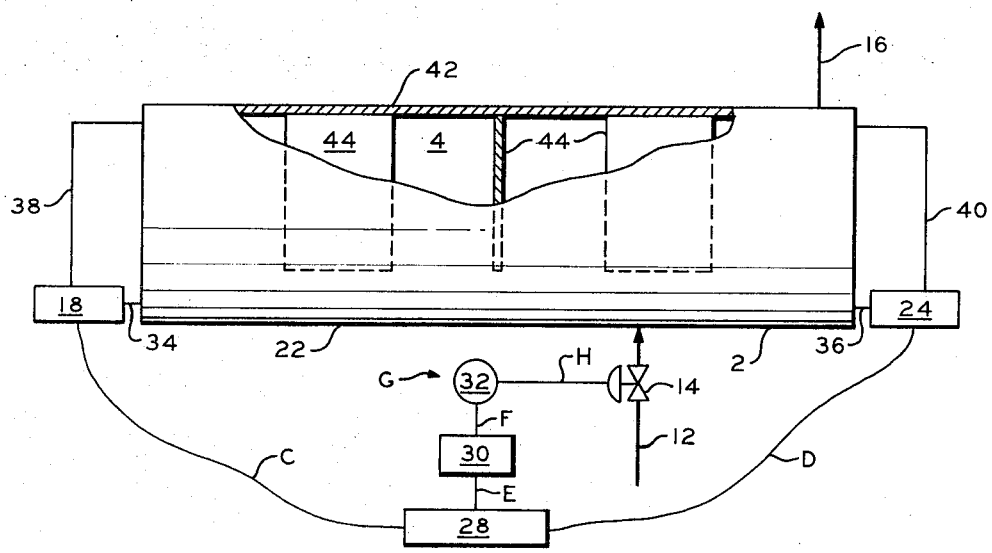
FIG. 1
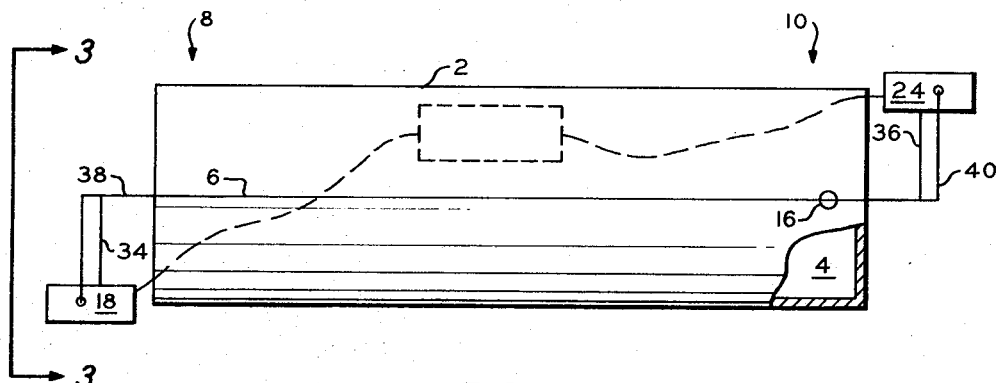
FIG. 2
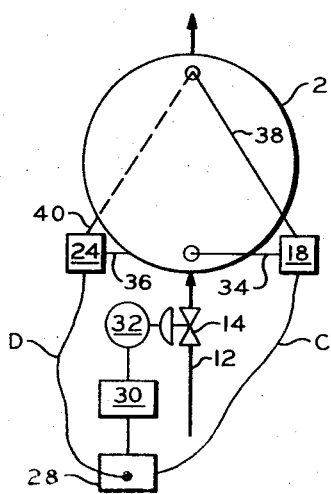
FIG. 3
FIG. 4
INVENTOR.
H. A. CLAYTON
BY Young & Quigg
ATTORNEYS

METHOD AND APPARATUS FOR MEASURING AND CONTROLLING THE VOLUME OF LIQUID IN A VESSEL

In a controlled movable vessel which discharges fluid and controllably passes fluid into the vessel for maintaining the volume of liquid therein, such as a boiler of a sea-going ship for example, it is often difficult to obtain a satisfactory measurement of the liquid level in the vessel owing to the pitch and roll of the vessel which causes the liquid level adjacent a measuring location to drastically change during said movement. In situations where the vessel is a fuel tank or a boiler, the inability to obtain a satisfactory liquid level measurement may cause the ship to lose power and become helpless in a rough sea which could result in serious loss of life and property.

In summary, this invention resides in method and apparatus for more accurately measuring the liquid level in a movable vessel and controlling the volume of liquid in the vessel. First and second liquid level measuring-transmitting elements are connected at opposed ends of the vessel at a common elevation relative one to the other and on opposed sides of a vertical plane passing through the axis of the vessel. the first and second liquid level measuring-transmitting elements deliver respective signals C and D in response to their measurement of the liquid level in the chamber. The signals C and D are averaged and a signal F is delivered which is representative of the volume of liquid in the vessel. Signal F can be passed to a controller having a set point G and being connected to a valve in a conduit utilized for passing fluid into the vessel for receiving the signal F, comparing said signal F to the set point G, and delivering a signal H to the valve in response to said comparison for controlling the valve and thereby controlling the flow of fluid through the conduit and into the vessel.

Other aspects, objects, and advantages of the present invention will become apparent from a study of the disclosure, the appended claims, and the drawings.

The drawings are diagrammatic views of the vessel having the subject invention installed thereon.

FIG. 1 shows a side view of the vessel,

FIG. 2 shows a top view of the vessel,

FIG. 3 shows an end view of the vessel taken along line 3—3 of FIG. 2 and

FIG. 4 shows a partial side view of the vessel with another embodiment of the invention.

Referring to the drawings, a movable vessel 2, such as a boiler aboard a sea-going ship for example, has a chamber 4, a longitudinal axis 6, first and second end portions 8,10, an inlet conduit 12 having a valve 14 positioned therein for controllably passing fluid into the vessel chamber 4, and an outlet conduit 16 for controllably discharging fluid from the vessel 2. In the example boiler, water is passed into the chamber 4 at which location it is heated by apparatus (not shown) and steam is discharged through the outlet conduit 16 to supply power for the ship.

A first liquid level measuring-transmitting element 18 such as Taylor differential level transmitter Model 214T, available from Taylor Instrument Company, Rochester, N.Y., for example, preferably a pressure measuring element, is connected in fluid communication with the chamber 4 at one end of the vessel.

The first element 18 measures the liquid level in the vessel 2 adjacent the end of the vessel 2 and delivers a signal C in response to said measurement.

A second liquid level measuring-transmitting element 24, preferably of the same type as the first (18) and is connected in fluid communication with the chamber 4. Referring to FIGS. 1, 2, and 3, the second element 24 is at the second opposed end of the vessel 2 and at a common elevation relative to the position of the first element 18 on the vessel. The second element 24 is laterally spaced a common distance in an opposed direction from said vertical plane relative to the first element 18.

The second element 24 measures the liquid level in the vessel 2 adjacent the second location and delivers a signal D in response to said measurement.

An adder 28 is connected to the first and second liquid level measuring-transmitting elements 18,24 for receiving the signals C and D, adding the signals, and delivering a signal E responsive to the sum of the signals C and D. A dividing element 30 is connected to the adder 28 for receiving the signal E, dividing the signal E in two for deriving an average, and delivering a signal F representative of the average of signals C and D and the volume of liquid in the vessel. Elments 28 and 30 can be a single element, such as a portion of Moore Products Model 68-3 averaging relay, available from Moore Products Company, Philadelphia, Pa., for example.

A controller 32 having a set point G can be connected to the divider 30 and the valve 14 for receiving the signal F, comparing said signal F to the set point G, and delivering a signal H to the valve in response to said comparison for controlling the flow of liquid into the chamber 4 via the inlet conduit 12.

It should be understood that the combination of elements 28, 30, and 32 are provided for averaging the signals C and D and controlling a liquid or a fluid flow rate into the chamber in response to a comparison of the average signal F and the set point G. Other equipment can be utilized to obtain the averaged signal F without departing from the invention.

Referring to FIG. 4, in order to provide apparatus that is of more flexible construction, the first and second liquid level measuring-transmitting elements 18,24 are each connected to the vessel 2 by respective first and second conduits 34,36 which have a substantially common length for spacing said first and second elements 18,24 common vertical and lateral distances from the vessel. Where the elements 18,24 are differential pressure measuring elements and the vessel 2 is a pressurized vessel, vapor pressure lines 38,40 are each connected at one end to its respective element 18 or 24 and at the other end to and in communication with the vessel chamber 4 adjacent an upper wall 42 of the vessel and at a common elevation.

In order to further provide for more accurate measurement of the liquid level in the moving vessel 2, baffle plates 44 of various dimensions and locations can be positioned in the chamber 4 for minimizing the liquid flow through the chamber 4 during pitch and roll of the vessel 2.

In order to compensate for roll of the vessel 2, it is preferred that the first and second elements 18,24 are each spaced a common opposed lateral distance from the vessel and the vertical plane passing through axis 6.

Where pressure or differential measuring elements are used, the sensitivity of the element that is required can be reduced by providing conduits 34 and 36 and positioning the elements at a common elevation lower than the lower wall 22 of the vessel 2 as shown in FIG. 4.

In the operation of the apparatus, movement of liquid toward the first end portion 8 of the vessel 2, for example, caused by said first end portion 8 being moved to a lower elevation than the second end portion 10, the first element 18 will measure a greater liquid depth than the second element 24. Since the elements are spaced a common distance along the axis from he median point of the vessel 2, averaging of the measurements compensates for pitch and produces a signal which indicates the liquid level of the vessel as if it were substantially level. In the same manner, roll of the vessel causes different measurements by the elements 18,24 and subsequent signal averaging compensates for such roll.

Placement of the vessel relative to the ship also facilitates increasing measurement accuracy. As known in the art, the more narrow the ship's hull, the greater will be the tendency of the ship to roll in rough seas and the shorter the ship the greater will be the amount of pitch. The vessel's longitudinal axis should preferably therefore be aligned with the direction in which the least movement is expected. Positioning of the vessel has been herein described with reference to roll and pitch of the vessel with its longitudinal axis extending along the longitudinal axis of the ship.

Other modifications and alterations of this invention will become apparent to those skilled in the art from he foregoing discussion and accompanying drawings, and it should be understood that this invention is not to be unduly limited thereto.

What is claimed is:

1. Apparatus for measuring the liquid in a vessel having a chamber and an axis, comprising:
    a first liquid level measuring-transmitting element connected in fluid communication with the chamber, said first element being at a first end portion of the vessel and laterally spaced a first distance from a vertical plane passing through and along the axis for measuring the liquid level in the chamber and delivering an electrical signal C in response to said measurement;
    a second liquid level measuring-transmitting element connected in fluid communication with the chamber, said second element being at an opposed second end portion of the vessel, at a common elevation relative to the first element and laterally spaced a common distance in an opposed direction from the vertical plane relative to the first element for measuring the liquid level in the chamber and delivering an electrical signal D in response to said measurement; and
    an electrical signal averaging means for receiving the electrical signals C and D from the first and second liquid level measuring-transmitting element, and delivering an electrical signal F representative of the average of signals C and D.

2. An apparatus, as set forth in claim 1, wherein the electrical signal modifying means comprises an adder connected to the first and second liquid level measuring-transmitting elements and to a divider to the controller.

3. An apparatus, as set forth in claim 1, wherein the first and second liquid level measuring-transmitting elements are each connected to the vessel by respective first and second conduits having a common length for spacing said first and second elements common vertical and lateral distances from an axis of the vessel.

4. An apparatus, as set forth in claim 3, wherein the first and second elements are each located at a common elevation lower than a lower wall of the vessel.

5. An apparatus, as set forth in claim 4, wherein the electrical signal modifying means comprises an adder connected to the first and second liquid level measuring-transmitting elements and to a divider and wherein the vessel has a conduit connected to the vessel in communication with the chamber;
    a valve positioned in the conduit for controlling the flow of fluid through the conduit and into the chamber; and
    a controller having a set point G and being connected to the valve and to the signal averaging means for receiving the signal F, comparing said signal F to the set point G, and delivering a signal H to the valve in response to said comparison for controlling the valve.

6. An apparatus, as set forth in claim 5, wherein the first and second liquid level measuring-transmitting elements are differential pressure measuring elements and each element has a conduit connecting the element in fluid communication with the chamber at a common elevation adjacent an pper wall of the vessel.

7. An apparatus, as set forth in claim 1, wherein the first and second liquid level measuring-transmitting elements are differential pressure measuring elements and each element has a conduit connecting the element in fluid communication with the chamber at a common elevation adjacent an upper wall of the vessel.

8. An apparatus, as set forth in claim 1, wherein the vessel has a conduit connected to the vessel in communication with the chamber;
    a valve positioned in the conduit for controlling the flow of fluid through the conduit and into the chamber; and
    a controller having a set point G and being connected to the valve and to the signal averaging means for receiving the electrical signal F, comparing said signal F to the set point G, and delivering a signal H to the valve in response to said comparison for controlling the valve.

9. A method for measuring the liquid in a vessel, comprising:
    measuring the liquid level in the vessel at a first location, said first location being at a first end portion of the vessel and laterally spaced a first distance from a vertical plane passing through and along the axis of the vessel and delivering an electrical signal C in response to said measurement;
    measuring the liquid level in the vessel at a second location, said second location being at an opposed second end portion of the vessel, at a common elevation relative to the first location and laterally spaced a common distance in an opposed direction from the vertical plane relative to the first location and delivering an electrical signal D in response to said measurement; and
    receiving the signals C and D, adding the signals C and D to obtain a sum, dividing said sum by two and delivering an electrical signal F in response to said division, said signal F being representative of the liquid in the vessel.

10. A method, as set forth in claim 9, further including maintaining the volume of liquid in the vessel by receiving the electrical signal F, comparing said signal F to a set point G, and delivering a signal H in response to said comparison; and receiving the signal H and passing fluid into the vessel in response to said received signal H.

11. In a vessel having a chamber and an axis, the improvement comprising:

a first liquid level measuring-transmitting element connected in fluid communication with the chamber, said first element being at a first end portion of the vessel and laterally spaced a first distance from a vertical plane passing through and along the axis for measuring the liquid level in the chamber and delivering a signal C in response to said measurement;

a second liquid level measuring-transmitting element connected in fluid communication with the chamber, said second elment being at an opposed second end portion of the vessel, at a common elevation relative to the first element and laterally spaced a common distance in an opposed direction from the vertical plane relative to the first element for measuring the liquid level in the chamber and delivering a signal D in response to said measurement; and a signal averaging means for receiving the signals C and D from the first and second liquid level measuring-transmitting element, and delivering a signal F representative of the average of signals C and D.

12. A method for measuring the liquid in a moving vessel from which fluid is discharging, comprising:

measuring the liquid level in the vessel at a first location, said first location being at a first end portion of the vessel and laterally spaced a first distance from a vertical plane passing through and along the axis of the vessel and delivering a signal C in response to said measurement;

measuring the liquid level in the vessel at a second location, said second location being at an opposed second end portion of the vessel, at a common elevation relative to the first location and laterally spaced a common distance in an opposed direction from the vertical plane relative to the first location and delivering a signal D in response to said measurement;

receiving the signals C and D, adding the signals C and D to obtain a sum, dividing said sum by two and delivering a signal F in response to said division, said signal F being representative of the liquid in the vessel.

* * * * *

UNITED STATES PATENT OFFICE

CERTIFICATE OF CORRECTION

Patent No. 3,754,560                 Dated: August 28, 1973

Hadwen A. Clayton

It is certified that error appears in the above-identified patent and that said Letters Patent are hereby corrected as shown below:

Column 3, lines 67-68, delete "to the controller"; column 4, line 30, the word "pper" should read — upper —.

Signed and sealed this 2nd day of April 1974.

(SEAL)
Attest:

EDWARD M.FLETCHER,JR.
Attesting Officer

C. MARSHALL DANN
Commissioner of Patents